United States Patent [19]

White

[11] 4,319,763
[45] Mar. 16, 1982

[54] COLLAPSIBLE LIGHTWEIGHT BICYCLE FENDERS AND METHOD OF ATTACHING FENDERS TO THE BICYCLE FRAME

[76] Inventor: Stoughton K. White, 3470 S. Logan, #24, Englewood, Colo. 80110

[21] Appl. No.: 61,385

[22] Filed: Jul. 27, 1979

[51] Int. Cl.³ ............................................. B62D 25/16
[52] U.S. Cl. .......................... 280/152.3; 280/154.5 A
[58] Field of Search .......... 280/152.3, 152.1, 154.5 A, 280/152 R, 154.5 R, 155, 159; 296/78.1, 78 A, 78 R, 82, 83; 160/DIG. 1; 403/392; 24/27, 30.5 T

[56] References Cited

U.S. PATENT DOCUMENTS

| | | | |
|---|---|---|---|
| 335,646 | 2/1886 | Sniffen | 280/155 |
| 861,562 | 7/1907 | Wade | 403/392 |
| 917,478 | 4/1909 | Noble | 403/392 |
| 1,176,750 | 3/1916 | Green | 280/152.1 |
| 2,579,489 | 12/1951 | Gianelloni, Jr. | 24/27 |
| 2,932,270 | 4/1960 | Wintermantel | 280/152.1 X |
| 3,829,152 | 8/1974 | Hobbs | 296/78 R |

FOREIGN PATENT DOCUMENTS

| | | | |
|---|---|---|---|
| 965474 | 6/1957 | Fed. Rep. of Germany | 296/78.1 |
| 7236 | of 1897 | United Kingdom | 280/152.3 |
| 26291 | of 1897 | United Kingdom | 280/152.3 |

Primary Examiner—Joseph F. Peters, Jr.
Assistant Examiner—Milton L. Smith
Attorney, Agent, or Firm—John R. Ley

[57] ABSTRACT

Lightweight collapsible bicycle fenders are selectively attached to and detached from a bicycle frame by ties. The fenders are preferably formed from a sheet of durable flexible material, and the sheet of material is given sufficient rigidity and form to define the bicycle fender by lateral support elements. Flexible ties extend from the support elements. Once the fender is placed in the appropriate position, the ties are extended around opposite sides of a bicycle frame member and twisted together or otherwise fastened, thereby attaching the fender to an appropriate part of the bicycle frame and retaining the support elements and the flexible sheet of material in functional form as a fender.

9 Claims, 6 Drawing Figures

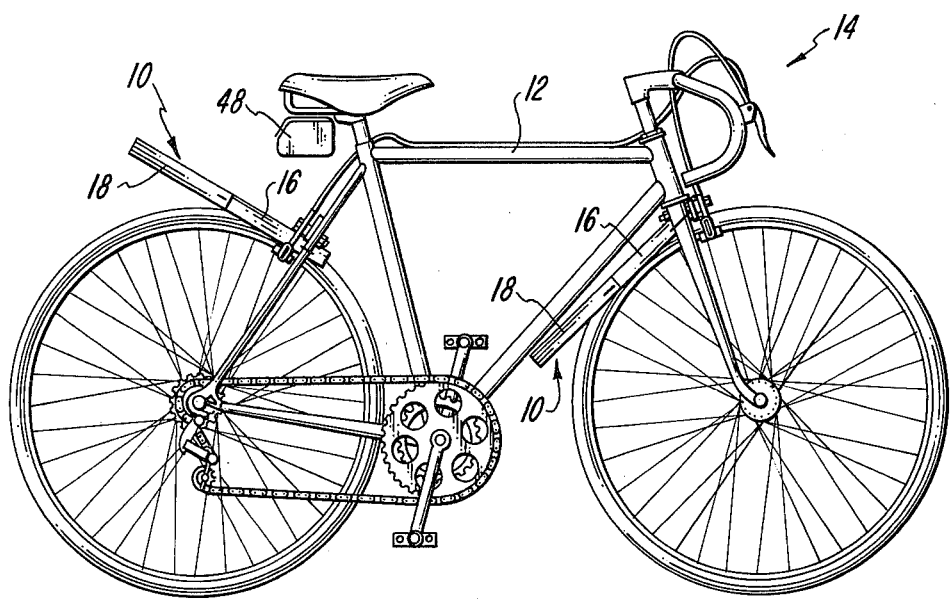
Fig_1
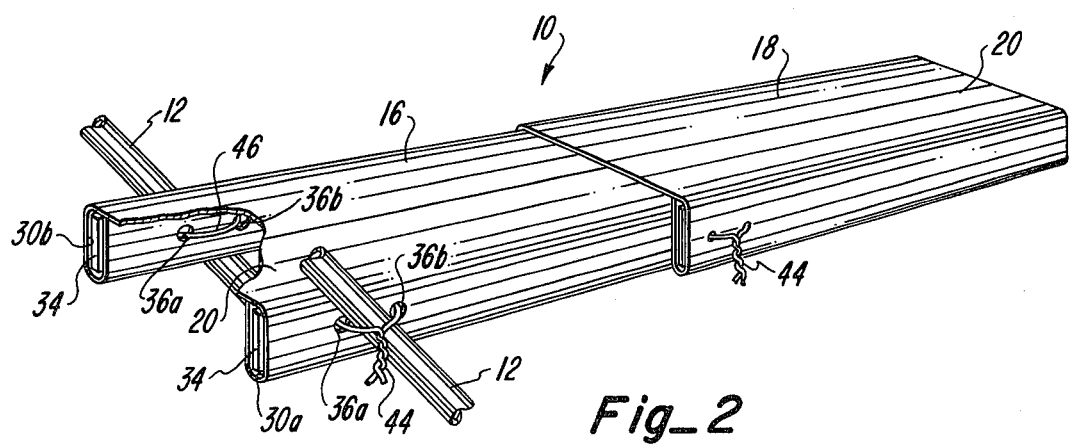
Fig_2

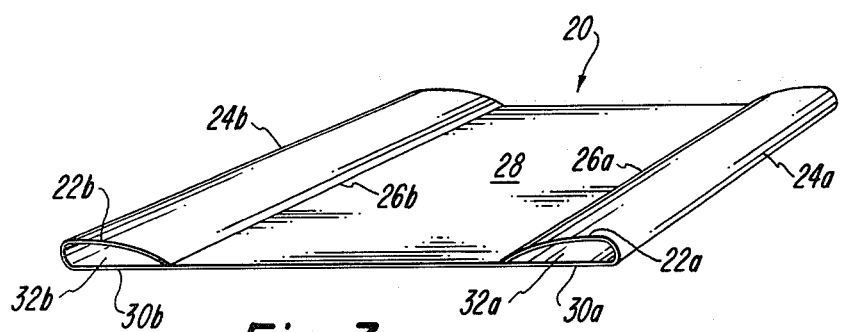
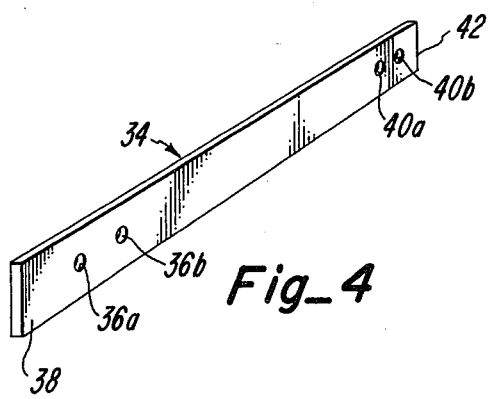
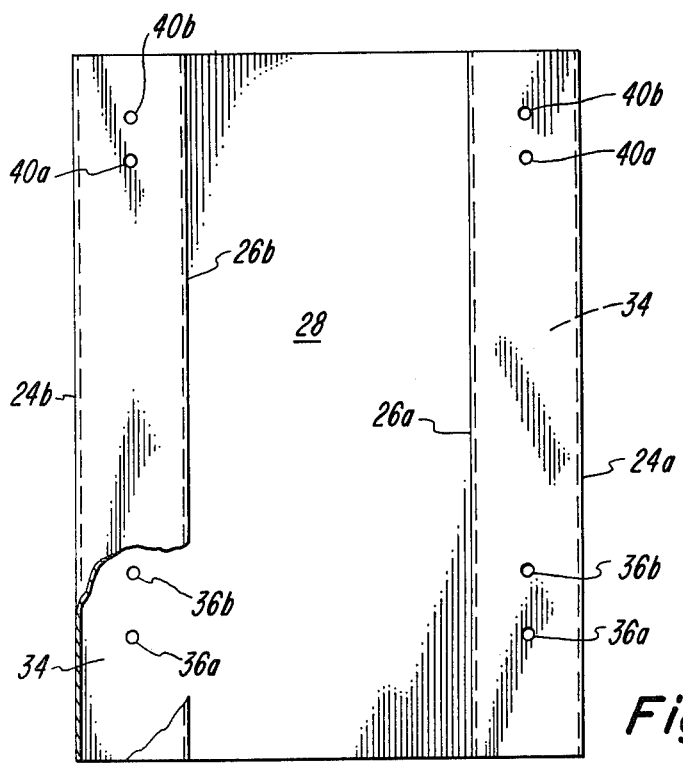
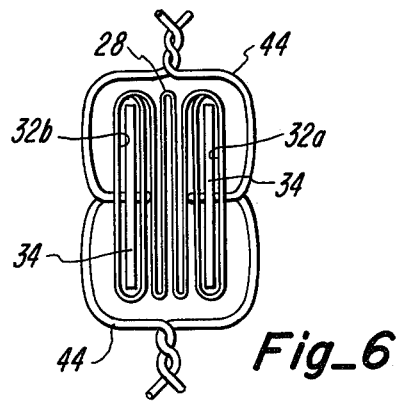

COLLAPSIBLE LIGHTWEIGHT BICYCLE FENDERS AND METHOD OF ATTACHING FENDERS TO THE BICYCLE FRAME

BACKGROUND OF THE INVENTION

1. Field of the Invention

This invention relates to bicycles and other similar vehicles, and more particularly to selectively attachable lightweight flexible bicycle fenders and a method of attaching the fenders to the bicycle. The invention is primarily useful for bicycles which are usually not equipped with fenders.

2. Brief Description of Prior Art

A significant portion of modern bicycles are of the lightweight multiple speed or ten-speed variety. The majority of these bicycles are not equipped with fenders, primarily because the fenders add unnecessary weight to the bicycle, increase costs, and detract from the desired appearance of the bicycle. The lack of fenders poses no particular problem under conditions of normal use. However when it is necessary to ride in the rain or over a wet surface, the tires pick up water, mud, sand and other material and throw material on the back and front of the rider. Under these adverse conditions it is desirable to have fenders on the bicycle to protect the rider as much as possible from the water material picked up by the bicycle tires.

The frames of most lightweight bicycles have no provision for the attachment of fenders. One type of rigid fender is available which can be attached to the frame, but the method of attachment is by mechanical fasteners such as screws and nuts. Attaching this type of fender requires the fabrication of special mounting devices on the bicycle frame to which the fender can be attached, and also requires the use of tools to connect and disconnect the mechanical fasteners to the mounting device. Furthermore, the rigid fender, typically made of aluminum, cannot be conveniently and easily carried with the rider when it is not attached to the bicycle frame. Another type of prior art fender for use only at the rear wheel is a resilient plastic fender having integrally molded clips on either side and on the front of the fender. To attach the fender to the bicycle frame, the fender is inserted between the rear seat stays of the frame and against the seat tube, and the clips resiliently retain the fender to the frame members. This type of fender cannot be used where brake wires or other bicycle elements extend between the two frame members to interfere with the fender, which is a typical situation for the rear brakes. Similarly, this rigid type of fender cannot be conveniently carried with the rider when not attached to the bicycle. Further prior art relating to the subject of bicycle fenders includes U.S. Pat. Nos. 598,312; 617,836; 979,074; and 1,226,323.

Other problems relating to fenders for lightweight multiple speed bicycles may be known or appreciated by those having skill in the art. Comprehension of the foregoing and other problems, however, should not detract from the significance of the present invention.

SUMMARY OF THE INVENTION

It is the general object of this invention to provide a new and improved conveniently detachable and collapsible fender for a bicycle or the like. Another general objective is to provide a new and improved method by which a lightweight fender can be selectively attached to a bicycle frame. Other objects are to provide an adequately sized fender made of lightweight flexible material to allow the fender to be collapsed or rolled up for convenient carrying and readily accessible storage in an eight inch bicycle seat bag, for example. Another objective is to provide a collapsible fender which is quickly and easily attachable to and detachable from the bicycle, which is relatively inexpensive, and which can be easily manufactured.

In accordance with these and other objects, the fender can be generally summarized as comprising a sheet of lightweight flexible durable material such as plastic to which longitudinally extending and laterally spaced support elements are attached. A pair of ties extends laterally outward from each support element. The fender is placed between a pair of laterally opposed bicycle frame members, such as the front forks or the rear seat stays. The ties are extended around the sides of the frame members and are twisted together or otherwise fastened, thereby securing the lateral support elements to extend generally parallel to the plane of rotation of the bicycle wheel with the sheet of plastic material stretched transversely therebetween to form a functional bicycle fender. Two sections of fenders such as the one just described may be attached together to extend the effective length of the fender. The two sections are attached by extending the ties of one section through a pair of apertures formed in the support elements of the other section. The ties are twisted and the two sections are jointed together to form a single enlarged fender.

A more complete understanding of the invention can be obtained from the following description of the preferred embodiment and from the drawing, as well as other advantages and objectives of the invention.

BRIEF DESCRIPTION OF THE DRAWINGS

FIG. 1 is a side elevational view of a lightweight multiple speed bicycle to which the fenders of the present invention have been attached at the front and rear wheels of the bicycle.

FIG. 2 is an enlarged perspective view of one of the fenders shown in FIG. 1, and a partial view of the bicycle frame member to which the fender has been attached.

FIG. 3 is a perspective view of a sheet of material forming a part of the fender.

FIG. 4 is a perspective view of a support element also forming a part of the fender.

FIG. 5 is a plan view of the sheet of material of FIG. 3 to which the support elements of FIG. 4 have been operatively attached, with portions of the sheet material broken away.

FIG. 6 is an end view of a fender which has been collapsed in one exemplary manner for storage and carrying.

DESCRIPTION OF THE PREFERRED EMBODIMENT

Fenders 10 of the present invention are illustrated in FIG. 1 attached to the frame member 12 of a bicycle 14 or the like. Each of the fenders 10 is shown in FIG. 2 to be formed preferably by two longitudinally connected fender sections 16 and 18, although one or any reasonable number of fender sections may be connected to obtain a fender of the desired length. Although the fender section described subsequently is referenced by numeral 16, it should be understood that the fender section 18 is of essentially the same construction.

The fender section 16 comprises a sheet 20 of durable flexible material such as light-weight plastic shown best in FIGS. 3 and 5. The sheet 20 is preferably rectangular, and two lateral side edge portions 22a and 22b are folded inwardly along longitudinal folds 24a and 24b toward a center portion 28 of the sheet 20. The longitudinal edges of the lateral side portions 22a and 22b are sealed respectively along longitudinal seams 26a and 26b to the center portion 28 of the sheet. The longitudinal seams 26a and 26b extend parallel to the longitudinal folds 24a and 24b. The side portions 22a and 22b respectively cooperate with intermediate portions 30a and 30b of the sheet 20 to define tubes 32a and 32b.

One lateral support element 34, in the form of an elongated length of flat support material shown in FIG. 4, is inserted into each of the support tubes 32a and 32b. The support element 34 is preferably of lightweight semi-flexible material, such as a strip of plastic or lightweight wood. One support element 34 extends substantially the full longitudinal length of each of the support tubes 32a and 32b. The longitudinal length of each fender section is preferably about eight inches, the length of a typical bicycle seat bag. Some flexibility of the support element 34 is desired so as to avoid breakage during storage. However, the material of the support element 34 should be sufficiently firm to adequately support the sheet of material and define a functional fender when attached to the bicycle frame.

A pair of apertures or holes 36a and 36b are formed through the support element 34 at one end 38 of the element 34, and a pair of holes 40a and 40b are formed through the support element 34 at the other end 42 of the element 34. The hole pair 36a and 36b is preferably set back to two inches from the termination of end 38. The hole pair 40a and 40b is located approximately one inch from the termination of end 42. The space between the holes 40a and 40b is approximately one half inch and the space between holes 36a and 36b is varied. The hole pair 36a, 36b is useful in attaching the fender sections to the bicycle frame and the space between holes is made different in accordance with the width of the part of the bicycle frame to which the fender section attaches to allow the fender to be attached at an appropriate angle in order to fit properly with respect to structural elements of the bicycle frame. The hole pair 40a, 40b is useful for connecting two fender sections 16 and 18 as a single fender 10.

As shown in FIG. 5, holes are formed through the lateral side portions 22a and 22b and the intermediate portions 30a and 30b of the tubes 32a and 32b in alignment with the holes 36a, 36b, 40a and 40b of the inserted support element. Support elements 34 of the same construction are inserted in both support tubes 32a and 32b of each fender section.

A strand or tie 44 extends through certain hole pairs formed through the tubes and support elements on each lateral side of the fender segment 16, as is shown in FIG. 2. A single tie element can be looped between the hole pairs 36a, 36b or 40a, 40b if desired. The center connecting portion 46 of a single tie 44 looped through a pair of holes is illustrated in FIG. 2. Each tie is preferably formed by a plastic coated length of malleable wire material, as is conventional.

Use and attachment of the fenders 10 is illustrated in FIGS. 1 and 2. Two or more fender sections 16 and 18 are connected together by overlapping the ends of the fender sections and extending the ties from one pair of holes 40a and 40b of the one section 18 through a pair of correspondingly spaced holes 40a and 40b of the other fender section 16. The ties inserted in each hole pair are firmly twisted or tied together to connect the two longitudinally aligned support elements 34 on each lateral side of the fender 10. Thus, the hole pairs 40a, 40b are primarily useful for attaching the two sections 16 and 18 together.

The fender 10 assembled from the two sections 16 and 18 is inserted between the two opposing frame members 12 such as the two tubes of the front bicycle fork or two seat stays to the rear wheel or the caliper arms on the rear wheel brakes. One tie extends on each side of the frame member 12. The free ends of the ties are thereafter fastened by twisting them together around the frame member 12. Connecting the stays around the frame member 12 pulls the support element 34 laterally outward, firmly connects the elements 34 to the frame members 12, and applies lateral support forces to the center portion 28 of the sheet 20. The support force from the ties, the rigidity of the support elements 34 and the strength of the center portion 28 all cooperate with the fender section structure to provide and define a functional fender.

Typically, connecting two eight inch fender sections 16 and 18 together will provide a fender 10 of sufficient length to act as an adequate shield for mud, water and the like. To connect two sections in longitudinal alignment, the holes 40a and 40b are spaced at the same intervals at the ends 42 of the support elements 34. The ends 42 and fender sections are thus overlapped and connected in the manner described. The other ends 38 of the support members provide the holes 36a and 36b which are used in connecting the fender to the bicycle frame member. To allow connection to a relatively wide frame member, such as the tubes of the front forks or the seat stay tubes to the rear axle, the hole pair 36a, 36b of fender section 16 is relatively widely spaced, for example one inch. The hole pair 36a, 36b in the support element 34 of the other longitudinally aligned fender section 18 can be spaced on a close interval, for example, one-fourth to one-half inch. The closely spaced hole pair 36a, 36b is used in connecting the fender to the narrow caliper arms of the rear brakes, for example. The user can select the hole pair 36a, 36b for the end of the fender 10 best adapted for attachment to one or another of the bicycle frame members.

The lightweight flexible nature of the fenders 10 requires very little retaining force to attach them to the bicycle frame members. The ties 44 are adequately capable of providing sufficient amounts of retention force. During periods when the bicycle fenders are not needed, they may be collapsed and stored in a bicycle seat bag (FIG. 1). FIG. 6 illustrates one exemplary way of collapsing the fenders in a minimum amount of space. The fender segments 16 and 18 are disconnected from one another and each segment is collapsed in the accordion style shown in FIG. 6. The ties of the laterally opposing support elements are looped together or around the accordion like bundle to hold the sheet material and support elements in a compact package of sufficiently small dimensions such that it can be easily stored in the bicycle seat bag.

It is apparent from the foregoing description that the bicycle fenders of the present invention can be formed of very lightweight but durable and inexpensive materials. The fenders can be quickly and easily attached to the bicycle without using mechanical tools or undue mechanical skill. The fenders can be quickly detached for storage when not needed and can be easily carried in a bicycle seat or the like for ready availability when needed. Many other advantages are apparent to those skilled in this art.

The foregoing embodiment of the invention and its method have been described with a certain degree of particularity. It should be understood, however, that this description has been made by way of example and that certain departures therefrom may be possible without departing from the spirit and scope of the invention defined in the appended claims.

What I claim as my invention:

1. A collapsible lightweight fender for selective attachment between two laterally spaced frame members between which a wheel of a bicycle or the like is positioned, comprising:
   a sheet of flexible durable lightweight material,
   a pair of longitudinal support elements, one longitudinal support element attached to each lateral side of said sheet to supply substantially only longitudinal support to said sheet,
   said sheet being substantially laterally unsupported, and
   a pair of flexible and hand-twistable tie members extending laterally from each support element, the tie members of each pair of tie members being longitudinally spaced a sufficient distance to receive a frame member therebetween.

2. A fender as defined in claim 1 further comprising:
   one longitudinally extending tube formed on each lateral side of said sheet, each tube adapted to receive a support element therein; and
   a pair of spaced apart apertures formed through each tube and through the support element within the tube, each aperture adapted to receive a tie member therein.

3. A fender as defined in claim 2 further comprising:
   a second pair of spaced apart apertures in addition to the pair of apertures first aforementioned, the second pair of apertures formed through each tube and the support element within the tube, the second pair of apertures located adjacent one longitudinal end of the tube, the first pair of apertures being located adjacent the other end of each said tube, and
   tie members extending from each aperture of at least one pair of apertures of each tube.

4. A collapsible fender for a bicycle or the like operatively defined by two fender sections retained in longitudinal alignment with ends of each fender section overlapping; each fender section comprising a sheet of flexible durable lightweight material, a longitudinal support element operatively attached to each lateral side of the sheet, and a pair of spaced apart apertures formed through each support element at a location adjacent one longitudinal end of the sheet; each pair of apertures in the support elements of one fender section opening into a different pair of apertures in the generally longitudinally aligned support elements of the other fender section when overlapped; and tie members extending through each aperture of both fender section at the overlapping end.

5. A method of using a flexible and hand-twistable tie for attaching a selectively removable fender to a bicycle or the like having two laterally spaced apart frame members between which a wheel is positioned, said tie having free ends, comprising:
   positioning the fender between the two spaced apart frame members with a portion of each lateral side of the fender interiorly adjacent a different one of the two spaced apart frame members
   flexibly extending the free ends of at least one tie from points spaced longitudinally of the fender on each lateral side of the fender at a position adjacent the frame member, and
   connecting the fender to the two spaced apart frame members only at the single locations on opposite lateral sides of the fender adjoining the frame members and supporting the fender at an angular relationship relative to the frame members and spaced from the wheel between the frame members as a result of the opposite connections at the single locations on each lateral side of the fender by bending each tie with only hand movement into contacting relationship with the adjacent frame member on opposite longitudinal sides of said adjacent frame member.

6. A method as defined in claim 5 further comprising twisting the pair of free ends to one another with the frame member therebetween.

7. A method as defined in claim 6 further comprising:
   forming a pair of spaced apart openings at the spaced points on each lateral side of the fender, and extending a tie through each of the openings with the free end of each tie extending away from the fender.

8. A method as defined in claim 7 further comprising:
   extending a single tie through each pair of openings on each lateral side of the fender with the opposite free ends of each tie extending away from the fender.

9. A method of using a flexible tie for attaching a selectively removable fender to a bicycle or the like having two laterally spaced apart frame members between which a wheel is positioned, comprising:
   forming the fender of lightweight flexible sheet material and attaching longitudinal support elements to each lateral side of the sheet material,
   forming a pair of spaced apart openings on each lateral side of the fender and through the longitudinal support element on the lateral side of the fender,
   extending a free end of at least one tie through each of the openings on each lateral side of the fender, and
   twisting the free ends of each pair of free ends on each lateral side of the fender to one another with the frame members between the pair of twisted free ends.

* * * * *